Patented June 1, 1943

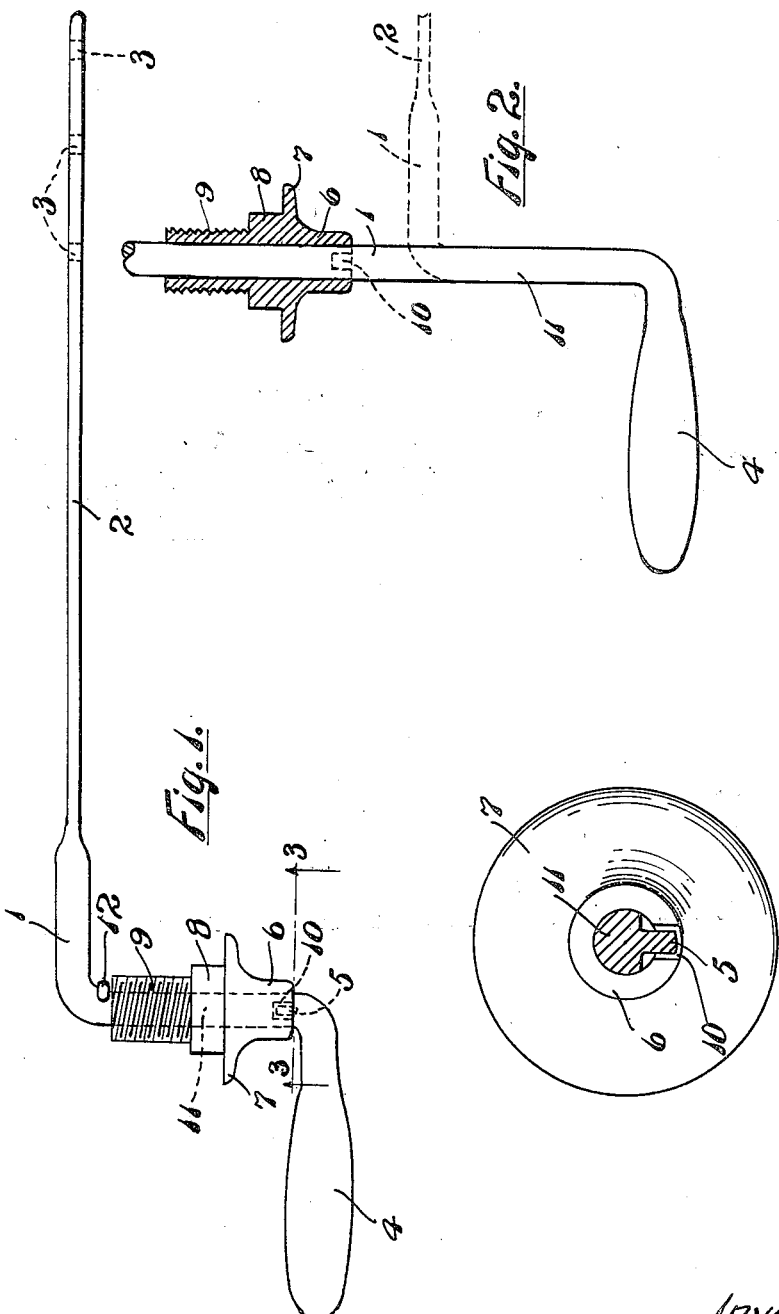

2,320,912

UNITED STATES PATENT OFFICE 2,320,912

FLUSH TANK OPERATING APPARATUS

Basil R. Crampton, Grand Rapids, Mich.

Application November 25, 1942, Serial No. 466,877

7 Claims. (Cl. 4—67)

This invention relates to flush tank operating apparatus, being particularly concerned with the valve actuating lever assembly mounted on the tank, manual operation of which lifts the valve and permits the flow of water from the tank.

I have heretofore obtained Patent No. 2,233,159 granted February 25, 1941, wherein a valve actuating lever assembly is provided which as a unit may be applied to the tank, there being no necessity of applying the lever in two separated parts, one at the inner side of the tank and one at the outside, connecting them together after such tank application has been made. In the present invention it is a primary object and purpose to produce the unit valve operating lever assemblies in a most simple and economical manner, reducing the cost of manufacture and providing a lever assembly ready to be attached to a tank which will consist of two parts only with which, when attached to the tank, a nut is used for securing in place.

It is a further object of the invention to produce the lever element from a single length of uniform diameter rod which is readily shaped and formed as desired for the purpose, and over which a mounting and attaching fixture or sleeve may be placed and the final bending operation upon the rod performed after such fixture has been assembled on the rod.

The invention is of a very practical, simple and economical form and of greater strength and durability than previous levers of the type which have been made in two parts and connected together.

An understanding of the invention may be had from the following description taken in connection with the accompanying drawing, in which, Fig. 1 is a plan view of the lever apparatus of my invention.

Fig. 2 is a fragmentary plan view and partial section illustrative of the manner in which the lever assembly is manufactured, and Fig. 3 is an enlarged section substantially on the plane of line 3—3 of Fig. 1.

Like reference characters refer to like parts in the different figures of the drawing.

In the production of the present invention a length of a metallic rod 1 of uniform diameter is provided which is flattened for a portion of its length from one end preferably more than one-half the length of the rod, as indicated at 2, and through the flattened portion near the free end thereof a plurality of transverse openings 3 may be made for the usual connection of the flush valve thereto. The opposite end portion of the rod is turned at right angles and is swaged into a handle 4. From the rod adjacent the juncture of the handle therewith a lug 5 is stamped to extend outwardly as shown in Fig. 3, the use of which will be hereinafter described.

Over the rod an attaching fixture is slidably placed until it comes substantially to the handle. The fixture 6 as shown is of single or unitary structure and of sleeve form provided with a relatively large annular flange 7 at the inner side of which is a projection 8, usually square in cross section, from the inner side of which a threaded stem 9 extends there being a central axial opening from the outer end of the fixture 6 to the inner end of the stem 9 whereby it may be readily located over said rod. Should the width of the flattened portion 2 be greater than the diameter of the opening through said sleeve fixture it will be placed on the rod prior to the flattening operation. The sleeve 6 has a notch 10 at its free end the width of which is greater than the thickness of the lug 5. The lug 5 enters said notch, as shown in Fig. 1, and with such structure a limited rocking movement of the rod 1 is permitted sufficient for the required throw of the lever to lift the flush valve. Such movement is stopped by the sides of the lug 5 engaging against the sides of the recess 10.

After the production has proceeded thus far, the attaching sleeve fixture is located as in Fig. 1 with the lug 5 in the recess 10, and the rod is then bent at right angles as illustrated in dotted lines in Fig. 2, providing an intermediate portion 11 of the rod between the handle 4 and the lever portion 2. It is about the axis of this intermediate portion that the lever rocks when a downward pressure upon the handle 4 is exerted to lift the flush valve attached to the outer end portion of the flattened section 2 of the lever. The apparatus is completed by upsetting said intermediate rocking section 11 immediately beyond the end of the threaded stem 9 to provide a stop projection 11 which holds the mounting sleeve fixture against movement lengthwise of said section 11 which passes therethrough.

This valve actuating lever is applied to a flushing tank in the same manner as in my Patent No. 2,233,159 above noted. From the outside of the tank the lever may be passed through a square or rectangular opening therein until the flange 7 comes against the outer side of the tank around said opening, with the projection 8 passing through the wall of the tank and filling the opening. A nut which may be passed over the lever to the stem 9 is thereupon screwed upon said stem and against the inner side of the tank whereupon the mounting of the lever upon the tank is complete.

With this structure there is required only the mounting sleeve for the lever as one element and a single length of uniform diameter rod as the other for the complete lever. There is an integral connection between the lever and the intermediate rocking section 11 and also between the handle 4 and said section. The operation of connecting parts together is avoided and the danger of weakness at such connections eliminated. The economy in manufacture is evident. In practice a steel or brass rod, or a rod of any suitable metal ¼" in diameter will normally be used, though of course the invention is not in any sense limited to said specific dimensions of the rod.

The invention is defined in the appended claims and is to be considered comprehensive of all forms of structure coming within their scope.

I claim:

1. In a structure of the class described, a unitary mounting fixture for application to a flush tank, said fixture having an axial opening therethrough, and a rod of uniform diameter located in said opening and extending through said fixture, said rod at one end of the fixture being turned laterally and formed into a handle and at the opposite end of the fixture being turned substantially at right angles to provide a lever portion adapted to have a flush tank valve connected therewith.

2. In a structure of the class described, a unitary mounting fixture adapted to be mounted upon and pass through the wall of a flush tank, said fixture having an axial opening therethrough disposed substantially at right angles to the plane of the flush tank wall, a rod located in said opening and extending through the fixture, said rod at one end of the fixture being turned laterally and formed into an operating handle and at the other end of the fixture being bent laterally to provide a lever arm adapted to have connected therewith a tank flushing valve, said rod at the last mentioned end of the fixture having an outwardly projecting stop thereon and means on the rod at the other end of the fixture cooperating with means on said fixture for permitting rocking movement of the rod about the axis of said opening through the fixture and preventing said rocking movement beyond predetermined limits.

3. In a structure of the class described, a unitary mounting fixture comprising, a sleeve having a longitudinal axial opening therethrough, said sleeve at one end having a threaded section, between its ends having a flange to bear against the outer side of a flushing tank wall and between said flange and threaded section having a non-circular section adapted to be seated in an opening through the wall of the flush tank and held against rotation, a rod extending through said axial opening in the fixture and rockably mounted therein, interengaging means on the rod and fixture to limit the rocking movement, said rod at the threaded end section of the fixture being bent at an angle and extended to provide a lever arm adapted to have attached thereto a flushing tank valve, and at the other end of the fixture being bent laterally and formed into an operating handle for manually imparting rocking movement.

4. In a structure of the class described, a unitary mounting fixture adapted to pass through an opening in the wall of a flush tank and be mounted thereon against rotation, said fixture having a longitudinal opening therethrough, a rod of uniform diameter passing through said fixture and at the inner end of the fixture being bent laterally and flattened to have opposite vertical sides, providing a lever arm to which a flush tank valve is adapted to be connected, said rod at the outer end of the fixture being turned laterally and providing a handle by means of which on depression of the handle the lever arm is elevated, means for limiting the extent of handle depression, and stop means on the rod at opposite ends of the fixture preventing relative longitudinal movement of said rod and fixture with respect to each other.

5. In a structure of the class described, a unitary mounting fixture adapted to be mounted upon and extend through the wall of the flushing tank and held against movement with respect thereto, said fixture having a longitudinal opening therethrough, and an integral handle, lever arm and connecting rocking shaft portion between said handle and lever arm formed from a rod of uniform diameter, said rock shaft portion passing through and rockably mounted upon said mounting fixture with the handle and lever arm extending laterally from adjacent the ends thereof, cooperating means on said rock shaft portion and the mounting fixture to limit rocking movement, and means preventing relative longitudinal movement of the mounting fixture and the rock shaft portion passing through it with respect to each other.

6. In a structure of the class described, a unitary mounted fixture of solid form having a projecting annular flange toward one end thereof, the opposite end portion thereof being exteriorly threaded, said fixture being adapted to be mounted upon and pass through an opening in the wall of a flush tank with the flange adapted to seal said opening at one end, said fixture having an axial opening therethrough to be disposed substantially at right angles to the plane of the flush tank wall, a rod of uniform diameter extending through said opening in the fixture, said rod at one end of the fixture being turned laterally and formed into an operating handle and at the other end of the fixture being bent substantially at right angles and adapted to have connected therewith a flush tank valve, said rod at the threaded end of the fixture having an outwardly projecting stop thereon, the outer end of which does not reach to the outer sides of said threaded section and means on the rod at the other end of the fixture cooperating with means on said fixture for permitting rocking movement of the rod about the axis of the opening through said fixture and preventing said rocking movement beyond predetermined limits, the diameter of the rod being appreciably less than the exterior diameter of the threaded portion of said fixture.

7. A construction containing the elements in combination defined in claim 6, said means on the rod and cooperating means on the fixture comprising an integral lug struck from the rod entering a slot in the adjacent end of said fixture, the walls of the slot being spaced apart a distance greater than the thickness of said lug.

BASIL R. CRAMPTON.